(12) United States Patent
Aspelmayr et al.

(10) Patent No.: US 8,046,157 B2
(45) Date of Patent: Oct. 25, 2011

(54) CONTROL SYSTEM AND WORK METHOD FOR A CONTROL SYSTEM

(75) Inventors: Josef Aspelmayr, Ried/Riedmark (AT); Bernd Falke, Pentling (DE)

(73) Assignee: Continental Automotive GmbH, Hannover (DE)

( * ) Notice: Subject to any disclaimer, the term of this patent is extended or adjusted under 35 U.S.C. 154(b) by 457 days.

(21) Appl. No.: 12/361,644

(22) Filed: Jan. 29, 2009

(65) Prior Publication Data
US 2009/0204315 A1 Aug. 13, 2009

(30) Foreign Application Priority Data
Jan. 29, 2008 (DE) .................. 10 2008 006 530

(51) Int. Cl.
*G06F 19/00* (2011.01)
*F02M 51/00* (2006.01)

(52) U.S. Cl. .................. 701/115; 701/104; 123/480

(58) Field of Classification Search ............. 123/406.64, 123/406.65, 478, 480, 486, 488; 701/1, 36, 701/101–105, 114, 115; 365/191, 194, 198, 365/230.02, 230.06; 710/1, 5, 58
See application file for complete search history.

(56) References Cited

U.S. PATENT DOCUMENTS

| 4,250,858 | A | * | 2/1981 | Jeenicke et al. | 123/486 |
| 5,583,410 | A | * | 12/1996 | Jacobson et al. | 318/696 |
| 6,192,859 | B1 | * | 2/2001 | LeFevre | 123/335 |
| 6,266,710 | B1 | | 7/2001 | Dittmer et al. | |
| 6,270,171 | B1 | * | 8/2001 | Krieg et al. | 303/125 |
| 6,690,606 | B2 | * | 2/2004 | Lovett et al. | 365/194 |
| 6,755,274 | B2 | * | 6/2004 | Mattes et al. | 180/282 |
| 6,865,473 | B2 | | 3/2005 | Moessinger et al. | |

FOREIGN PATENT DOCUMENTS

| DE | 197 33 748 C2 | 2/1999 |
| DE | 100 30 989 A1 | 1/2002 |
| DE | 100 41 448 A1 | 3/2002 |

* cited by examiner

*Primary Examiner* — Willis Wolfe, Jr.
(74) *Attorney, Agent, or Firm* — Laurence A. Greenberg; Werner H. Stemer; Ralph E. Locher

(57) ABSTRACT

A control system (and a method of operating the system for an internal combustion engine. The control system has a trigger circuit for supplying trigger signals and an output stage having a plurality of output channels which supply actuating signals. The trigger circuit and the output stage are connected to one another by a selection interface and a trigger interface that is a single control line which supplies a time control signal.

13 Claims, 7 Drawing Sheets

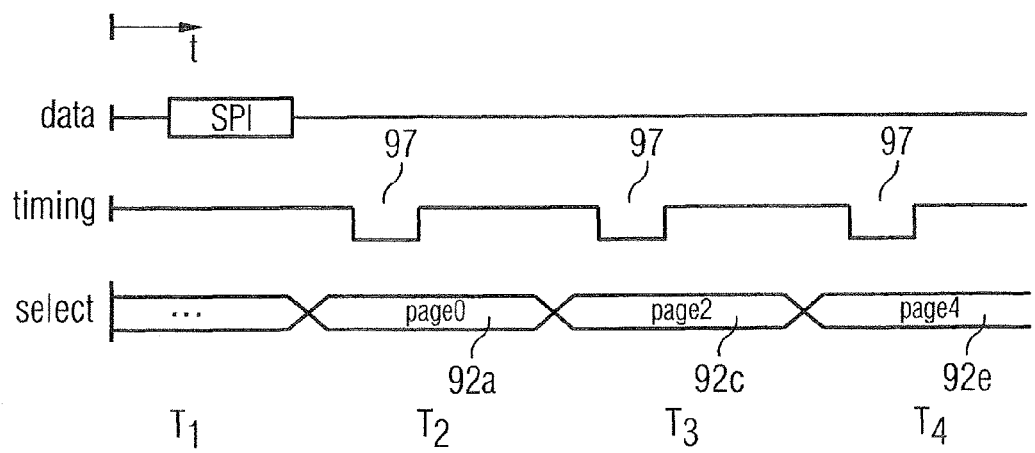

CONTROL SYSTEM AND WORK METHOD FOR A CONTROL SYSTEM

BACKGROUND OF THE INVENTION

Field of the Invention

The invention relates to a control system, in particular for an internal combustion engine, comprising a trigger circuit for supplying trigger signals as well as an output stage having a plurality of output channels for supplying actuating signals, wherein the trigger circuit and the output stage are connected to one another by a trigger interface.

The invention further relates to an operating method for a control system comprising a trigger circuit and an output stage coupled thereto.

Many control systems of the type described above are known. For example, from the field of automotive engineering it is known to trigger a plurality of injection valves of an internal combustion engine by supplying suitable actuating signals by means of an output stage.

Because internal combustion engines are becoming more and more powerful and are subject to increasingly strict regulations regarding allowable emissions of noxious substances, a very precise triggering of the individual injection valves and other control components is necessary. For this reason, in order to be able to trigger individual valves with a minimum time delay a large number of control lines between the trigger circuit and the output stage are often provided, by means of which the individual output channels of the output stage may be activated.

BRIEF SUMMARY OF THE INVENTION

The object of the present invention is to provide a particularly flexible control system that has a simplified construction. In particular, an arrangement having a small number of control lines between a trigger circuit and an output stage is to be possible.

The object is achieved by the features of the independent claims. Advantageous embodiments of the invention are specified in the sub-claims.

According to a first embodiment, a control system is notable for the fact that the trigger interface comprises a single control line for supplying a time control signal as well as a selection interface, the trigger circuit is set up to encode at least one signal shape selection and at least one channel selection in at least one selection signal and transmit it via the selection interface to the output stage, and the output stage is set up to decode the selection signal and upon supplying of the time control signal to supply an actuating signal determined by the selection signal and having at least one selected signal shape at at least one selected output channel.

By splitting the trigger interface into a single control line and a selection interface, by means of which a signal shape to be used and an output channel to be used may be determined, time-critical and time-non-critical information may be communicated separately. What is more, the number of control lines required may be reduced as a result of the joint use of the selection interface for the encoding of output channel and signal shape.

According to an advantageous embodiment, the output stage has a memory for a plurality of data pages, wherein by means of each data page at least one signal shape selection and/or at least one channel selection are determined, and the triggering device is set up to transmit a code word via the selection interface, wherein by means of the transmission of the code word one data page of the plurality of data pages is determined and selected by the demultiplexer for signal generation by means of the output stage.

By virtue of the storage and retrieval of data pages, which determine in each case a signal shape and/or an output channel, parameters that are crucial for supplying the actuating signal may be filed in advance in the output stage and, where necessary, retrieved by the demultiplexer.

According to a further advantageous embodiment, the selection interface has a plurality of parallel data lines for the parallel transmission of the code word and the output stage has a parallel decoder for decoding the parallel-transmitted code word.

The use of parallel data lines allows the necessary code words to be exchanged rapidly between the trigger circuit and the output stage.

According to a further advantageous embodiment, the selection interface has a serial data line for the serial transmission of the code word and the output stage has a serial decoder for decoding the serially transmitted code word. The use of a serial data line makes it possible to minimize the number of data lines needed to transmit the data.

According to a further advantageous embodiment, the trigger interface comprises an additional data interface, which is set up to transmit data from the trigger circuit to the output stage. The use of an additional data interface allows the transmission of parameters or data from the trigger circuit to the output stage.

According to a further advantageous embodiment, the data interface is embodied as a serial interface and the output stage comprises a decoder for decoding serially transmitted data. By using a serial data interface, a time-non-critical transmission of data from the trigger circuit to the output stage may be carried out by means of a single data line.

According to a further advantageous embodiment, the data interface is set up to transmit a plurality of data pages from the trigger circuit to the output stage, wherein by means of each data page at least one signal shape selection and/or at least one channel selection are determined for the output stage. By virtue of the definition of different data pages, which determine in each case a signal shape selection and/or at least one channel selection for the output stage, different parameter sets may be stored in the output stage.

According to a further advantageous embodiment, the trigger circuit is embodied as a programmable microcontroller. The use of a programmable microcontroller allows particularly flexible triggering of the output stage by the trigger circuit.

According to a further advantageous embodiment, the output stage is embodied as an application-specific integrated circuit. By designing the output stage as an application-specific integrated circuit, its operating speed may be increased.

According to an advantageous embodiment, the control system is set up to supply actuating signals for a plurality of injection valves. Particularly in the case of the triggering of a plurality of injection valves, the circuit arrangement may be simplified in the manner described above.

According to a further embodiment of the invention, an operating method for a control system, having a trigger circuit as well as an output stage coupled thereto and having a plurality of output channels, comprises the following steps:
- encoding at least one signal shape selection and at least one channel selection in at least one selection signal by means of the trigger circuit,
- transmitting the at least one encoded selection signal via a selection interface from the trigger circuit to the output stage, decoding the at least one encoded selection signal by means of the output stage and supplying an actuating signal, which is determined by the decoded selection signal and has at least one selected signal shape, at at least one selected output channel of the output stage when a time control signal is supplied from the trigger circuit via a single control line.

By virtue of the encoding, transmitting and decoding of at least one signal shape selection and at least one channel selection, a supplying of a relatively complex actuating signal may be activated in an accurately timed manner by means of a single time control signal.

According to an advantageous embodiment, in the decoding step at least one data page of a plurality of data pages of the output stage device is selected, wherein the selected data page comprises the at least one signal shape selection and the at least one channel selection. By virtue of the selection of one data page of a plurality of data pages, different combinations of signal shape selections and channel selections may be rapidly retrieved.

According to a further advantageous embodiment, in the encoding step at least one code word is determined by means of the trigger circuit, in the transmitting step the specific code word is transmitted, and in the decoding step the selected data page is selected on the basis of the transmitted code word. By virtue of the transmission of a code word, the communication between the trigger circuit and the output stage may be simplified.

There now follows a detailed description of exemplary embodiments of the invention with reference to the figures. The figures show:

BRIEF DESCRIPTION OF THE SEVERAL VIEWS OF THE DRAWING

In all of the figures, elements of an identical design or function are denoted by the same reference characters.

DESCRIPTION OF THE INVENTION

Figure 1:
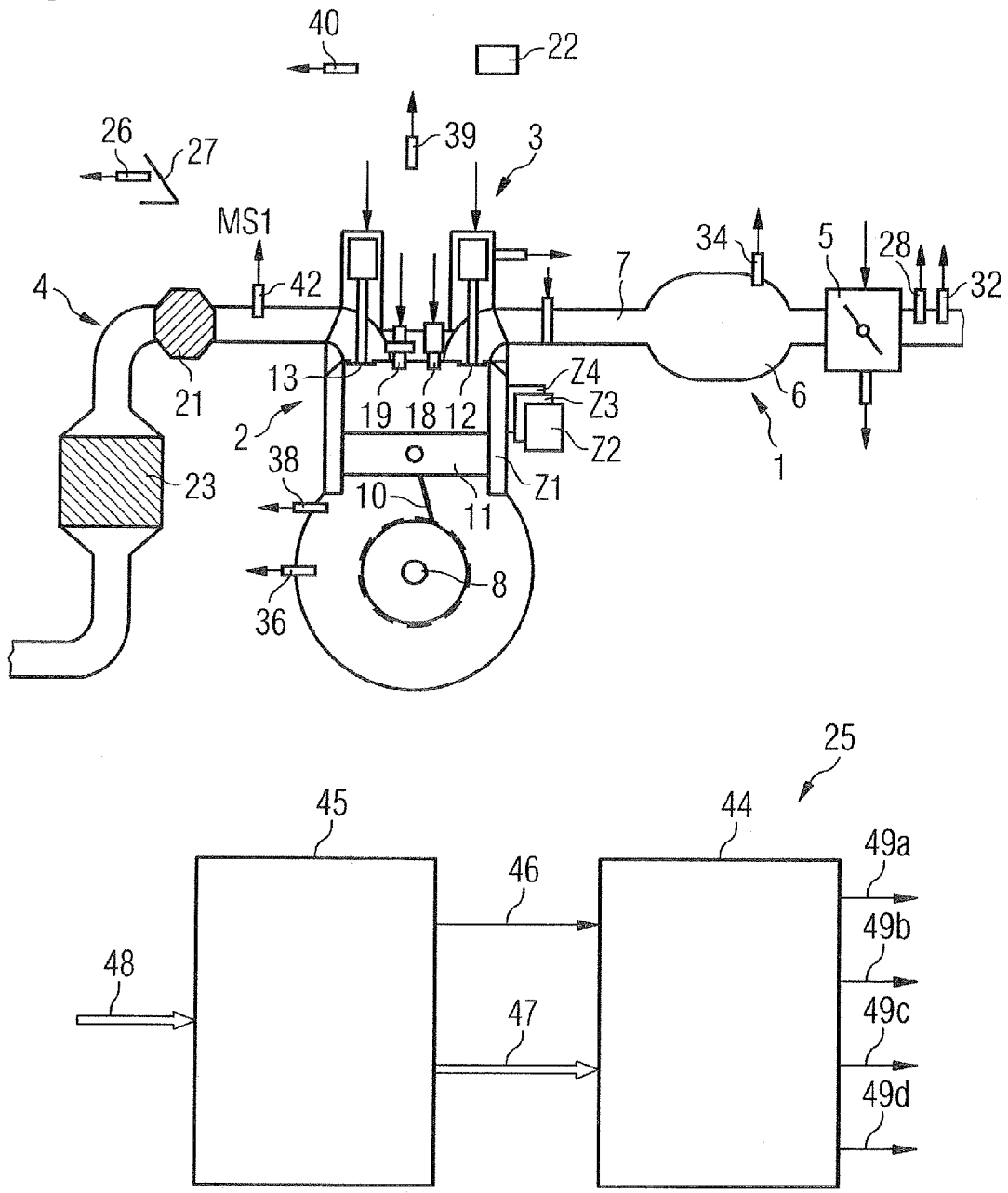
FIG. 1 an internal combustion engine with a control system.

An internal combustion engine (FIG. 1) comprises an intake tract 1, an engine block 2, a cylinder head 3 and an exhaust tract 4. The intake tract 1 preferably comprises a throttle valve 5, as well as a collector 6 and an intake manifold 7 that extends in the direction of a cylinder Z1 to an inlet channel into the engine block 2. The engine block 2 further comprises a crankshaft 8, which is connected by a connecting rod to the piston 11 of the cylinder Z1.

The cylinder head 3 comprises a valve operating mechanism having a gas inlet valve 12 and a gas outlet valve 13. The cylinder head 3 further comprises an injection valve 18 and a spark plug 19. Alternatively, the injection valve 18 may be disposed in the intake manifold 7.

Disposed in the exhaust tract 4 is a catalytic converter 21, which is preferably embodied as a three-way catalytic converter.

In a non-illustrated fluid feed to the injection valve 18 a fluid pump 22 is further provided, which in particular is embodied as a high-pressure pump. The fluid pump comprises an electrical actuator associated with it to enable control of its pumping behavior.

A control system 25 is provided, with which are associated sensors that detect various measured quantities and determine in each case the value of the measured quantity. Operating variables comprise, in addition to the measured quantities, variables derived therefrom. The control system 25 in dependence upon at least one of the operating variables determines manipulated variables, which are then converted into one or more actuating signals for controlling the final controlling elements by means of corresponding final control element operators.

The sensors are a pedal position sensor 26 that detects an accelerator pedal position of an accelerator pedal 27, an air-flow sensor 28 that detects an air flow upstream of the throttle valve 5, a first temperature sensor that detects an intake air temperature, an intake manifold pressure sensor 34 that detects an intake manifold pressure in the collector 1, a crankshaft angle sensor 36 that detects a crankshaft angle, to which a rotational speed N is then assigned.

A second temperature sensor 38 is further provided, which detects a coolant temperature. Further provided is a pressure sensor 39 that detects a fluid pressure, in particular in a high-pressure accumulator of the fluid feed. A third temperature sensor 40 is further provided, which detects a temperature, i.e. in particular a fluid temperature in the fluid feed, i.e. in particular in the high-pressure accumulator.

An exhaust-gas probe 42 is provided, which is disposed upstream of, or in, the catalytic converter 21 and detects a residual oxygen content of the exhaust gas and the measurement signal MS1 of which is characteristic of the air-fuel ratio in the combustion chamber of the cylinder Z1 and upstream of the exhaust-gas probe prior to oxidation of the fuel, hereinafter referred to as the air-fuel ratio in the cylinders Z1 to Z4.

Depending on the embodiment of the invention any desired subset of the described sensors may be provided or, alternatively, additional sensors may be provided.

The final controlling elements are for example the throttle valve 5, the gas inlet- and gas outlet valves 12, 13, the injection valve 18, the spark plug 19 or the fluid pump 22.

The control system 25 comprises at least one output stage device 44, which is embodied so as to generate an actuating signal for the respective final controlling element. The output stage 44 is for example an application-specific circuit (ASIC). The control system 25 further comprises a trigger circuit 45. The trigger circuit 45 in the illustrated exemplary embodiment is connected to a communications bus 48, for example a serial peripheral interface (SPI), for communication with the previously described sensors. The trigger circuit 45 is for example a programmable microcontroller.

The output stage 44 and the trigger circuit 45 are connected by a control line 46 and a selection interface 47. Via the selection interface 47 a suitable selection signal, for example in the form of a code word, is communicated from the trigger circuit 45 to the output stage 44. By supplying a time control signal via the control line 46, for example by setting the control line 46 to a predetermined voltage level, a signal shape selected by the output stage 44 is supplied at an output channel 49.

In addition to the cylinder Z1 further cylinders Z1-Z4 are also provided, with which corresponding final controlling elements and optionally sensors are then associated. The internal combustion engine may therefore have any desired number of cylinders Z1-Z4. Preferably one output stage device 44 each is provided for at least four cylinders Z1-Z4.

The control system 25 according to FIG. 1 comprises four output channels 49a to 49d. For example, each of the output channels 49a to 49d may be assigned to one injection valve 18 of the internal combustion engine.

Figure 2:
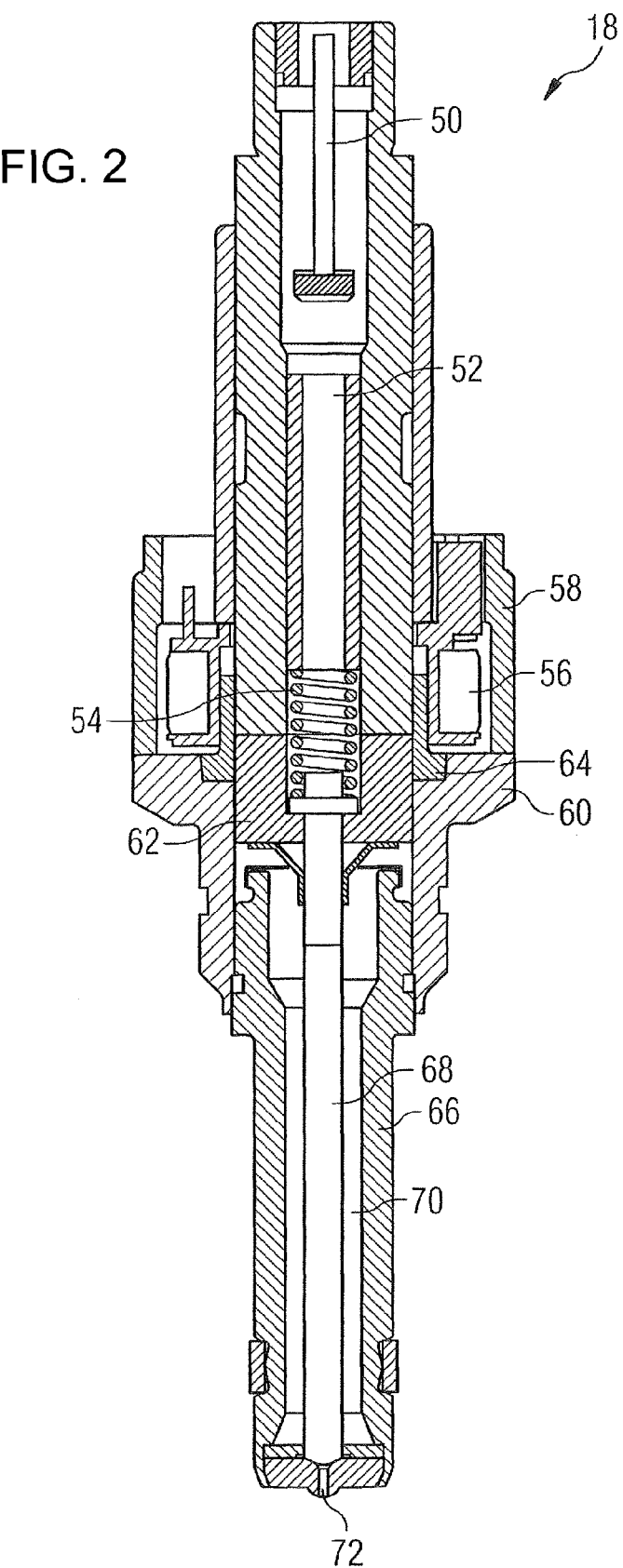
FIG. 2 a detail view of an injection valve.

The injection valve 18 (FIG. 2) comprises a fluid inlet body 50 with a fluid recess 52, which is hydraulically connected to the fluid feed and is supplied by the fluid feed in particular with fuel. The injection valve 18 further comprises a resetting spring 54. An electromagnetic actuator is provided, which comprises a coil 56, a magnetic housing 58, a valve body housing 60 and an armature 62 and in principle also the fluid inlet body 50. Furthermore, a non-magnetic housing 64 is also associated with the electromagnetic actuator.

The injection valve 18 moreover comprises a valve body 66, in which a valve needle 68 is disposed in a recess 70. The valve needle 68 is mechanically connected in such a way to the electromagnetic actuator, in particular to the armature 62, that in a closed position it prevents a flow of fluid through an injection nozzle 72 and outside of the closed position it enables a flow of fluid through the injection nozzle 72. A lift of the valve needle 68 is defined by its position in the closed position and on the other hand by its position—an open position—when the armature 62 is abutting the fluid inlet body 50. In this case, the lift of the valve needle 68 is at its maximum when the armature 62 is abutting the fluid inlet body 50. The injection valve may alternatively have any other actuator, i.e. for example a piezoelectric actuator.

A trigger operation for the metering of fluid is represented below by way of a current characteristic of a current I in FIG. 3 that is brought about by an actuating signal generated by the respective output stage 44. At an instant of time at the beginning of an idling period T_IDLE a time control signal NON is generated, namely by means of the trigger circuit 45, and transmitted to the respective output stage 44. The output stage 44 is designed so as to start a trigger operation for the respective injection valve 18 in dependence upon the time control signal NON. At the end of the idling period T_IDLE the control signal is generated in such a way that in the coil 56 the current I having a precharging current valve I_PRECH builds up. The current I is preferably adjusted by means of a two-step controller with a defined hysteresis HYS.

The precharging period T_PRECH may be defined in the output stage 44. It may however alternatively or additionally be influenced by determining by means of the selection interface 47 a parameter that makes it possible still to react also very promptly to changes of operating conditions. The end of the precharging period T_PRECH is followed by the start of a flying restart phase, namely for a defined flying restart period T_PEAK. During the flying restart phase the current through the coil 56 is increased to a flying restart current value I_PEAK. In order to achieve a particularly rapid rise of the current, an increased voltage value U_BOOST may for example be defined as an actuating signal. During the flying restart phase the current I is preferably limited to the flying restart current value I_PEAK and, here too, for example a two-step control operation may be effected, optionally also with a greater fluctuation range than during the precharging phase.

Given a correct mode of operation of the injection valve 18, the valve needle 68 reaches its maximum needle lift during the flying restart phase and hence releases the injection nozzle 72 to the maximum extent for the metering of fluid.

The flying restart phase is followed by a first clamping phase, namely for a first clamping period T_CL1. During the clamping phase a triggering operation occurs in the output stage 44 in such a way that its actuating signal contributes towards a rapid reduction of the current I in the coil 56.

The first clamping phase is followed by a first holding phase, namely for a first holding period T_HOLD1. In the first holding phase too, the current through the coil is preferably adjusted by means of a two-step controller with a hysteresis HYS, wherein this hysteresis may differ from the hysteresis during the precharging phase or the flying restart phase. During the first holding phase the current I through the coil 56 is preferably limited to a first holding current value I_HOLD1. At the end of the first holding period T_HOLD1 a second clamping phase begins, during which a triggering operation corresponding to the first clamping phase occurs, namely for a second clamping period T_CL2. The second clamping phase is followed by the start of a second holding phase, namely for a second holding period T_HOLD2, during which the current I through the coil 56 is adjusted to a second holding current value I_HOLD2, namely preferably by means of two-step control with the two-step controller. With resetting of the NON signal, the second holding current phase is then terminated. In this respect, the second holding period T_HOLD2 is determined by the occurrence of the event of resetting of the time control signal NON. Alternatively, the second holding period may be predetermined by previously set parameters.

The end of the second holding phase is then followed by the start of a third clamping phase, namely for a third clamping period T_CL3, during which by means of a corresponding trigger operation as in the first and second clamping phase the current I is reduced again to a neutral value, in particular to approximately zero. The third clamping phase is then followed by a fourth clamping phase, namely for a fourth clamping period T_ACL, during which by means of a corresponding trigger operation a preset clamping current value I_ACL having a preset negative value may be reached or is to be reached.

Figure 3:
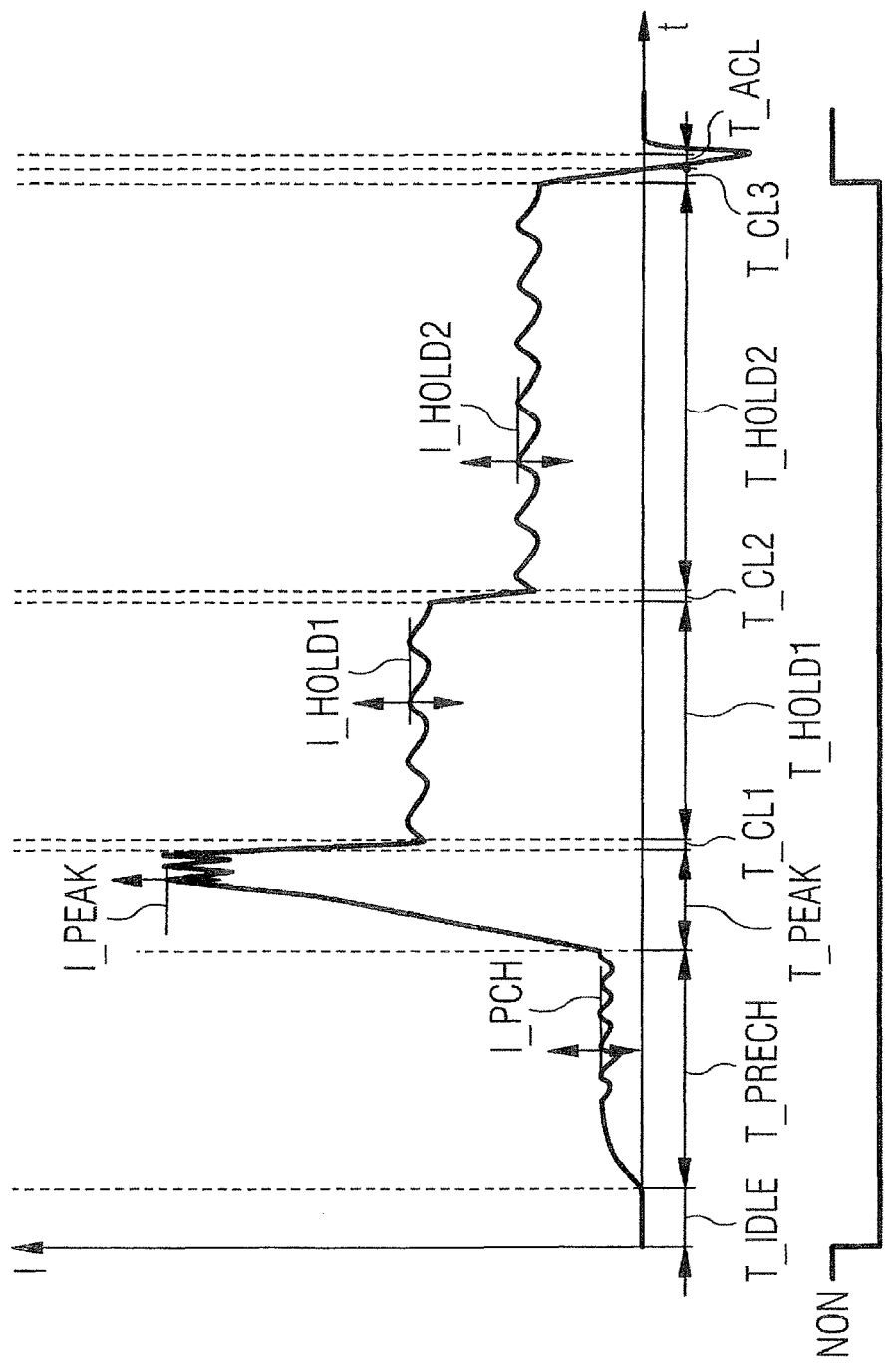
FIG. 3 a signal characteristic during a triggering operation of the injection valve, FIG. 4 a further embodiment of a control system, FIG. 5 a schematic representation of the layout of an output stage, FIG. 6A an encoding table of different data pages, FIG. 6B a time sequence of a data transfer from a trigger circuit to an output stage, FIG. 6C a sequence diagram of an embodiment of an operating method of a control system and FIG. 7 a sequence diagram of a further embodiment of an operating method of a control system.

The current characteristic represented in FIG. 3 serves as an example for a coil injector in a direct injection system. Naturally, other injection valves 18 of diesel- or spark ignition engines, such as for example piezoelectric injectors, may also be controlled by means of the described control system 25. Such injection valves as a rule require other characteristic signal charts. For example, direct injection systems are also known, in which a simple switching on and off of a respective output channel is sufficient for triggering. It is naturally also possible for other actuators, such as for example spark plugs 19 or ignition coils, to be supplied with one or more necessary trigger signals by the control system 25.

Figure 4:
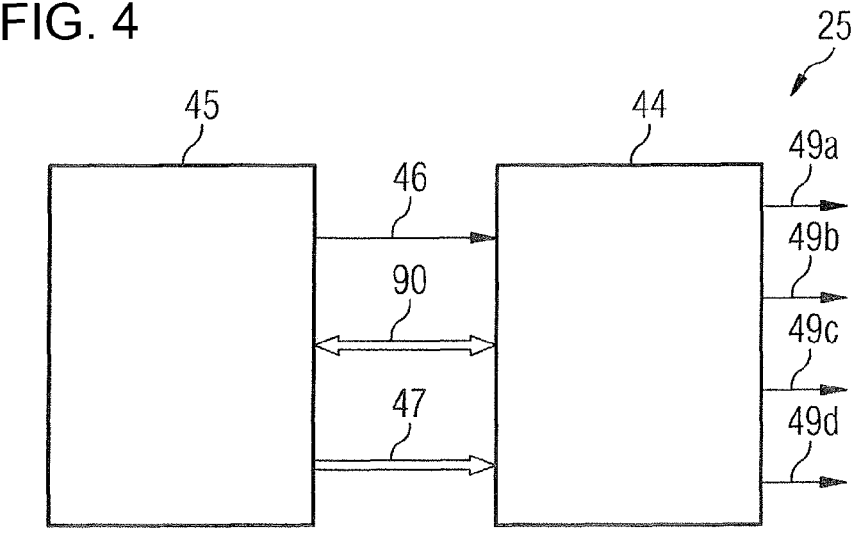

FIG. 4 shows the layout of a control system 25 according to a further embodiment. The control system 25 comprises an output stage 44 and a trigger circuit 45. The trigger circuit 45 and the output stage 44 are connected to one another by a single control line 46, a bidirectional data interface 90 and a selection interface 47. The function of the control line 46 and the selection interface 47 is similar to the control system 25 described with reference to FIG. 1. Via the additional data interface 90 control data and parameters may be exchanged between the trigger circuit 45 and the output stage 44. For example, it is possible to transmit control parameters for describing actuating signals from the trigger circuit 45 to the output stage 44. In the reverse direction it is also possible to retrieve state information from the output stage 44 by means of the trigger circuit 45. The data interface 90 is suitable in particular for programming data pages of the output stage 44. This is explained in detail below.

Figure 5:
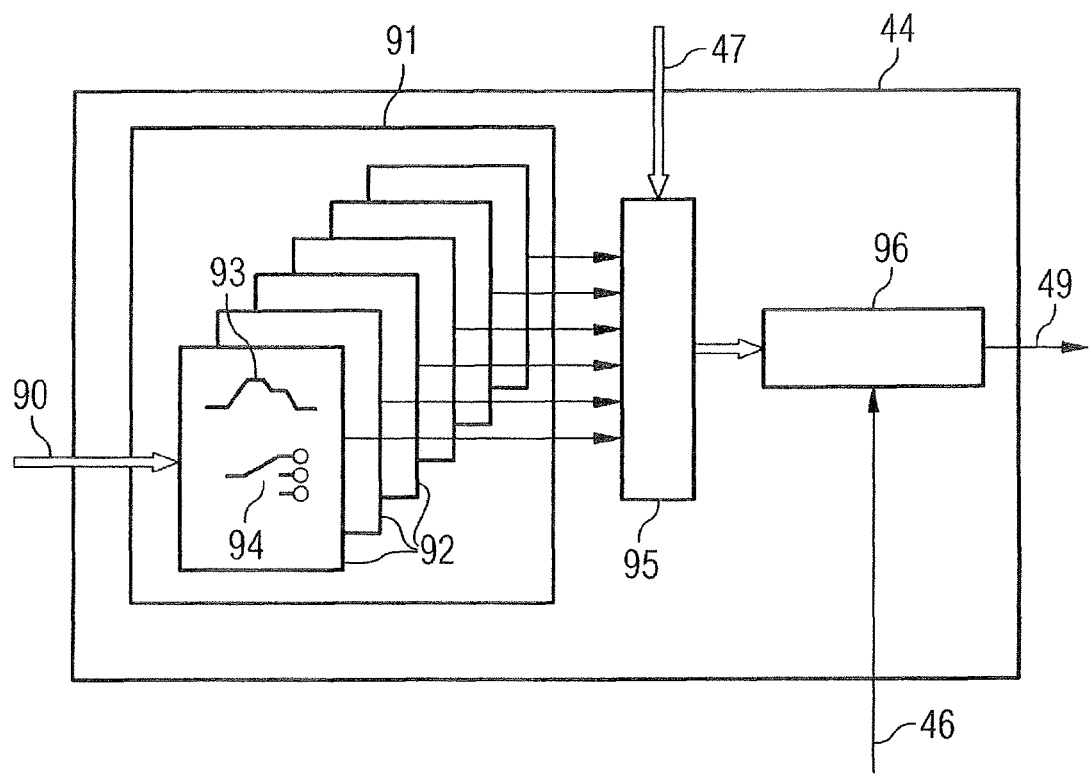

FIG. 5 shows a schematic representation of the layout of an output stage 44 according to an embodiment of the invention. The output stage 44 comprises a memory 91 for storing a plurality of data pages 92. In the exemplary embodiment, the memory 91 is set up to store six data pages 92. Each data page 92 comprises information that determines a signal shape selection 93 of an actuating signal as well as a channel selection 94 for defining an output channel 49 to be used for the output.

In the exemplary embodiment, the memory 91 is programmable via the data interface 90.

The output stage 44 moreover comprises a demultiplexer 95, which is triggered via the selection interface 47. For example, via the selection interface 47 a control code may be communicated, on the basis of which the demultiplexer 95 selects one of the data pages 92 from the memory 91. The required data or parameters are then transferred into one or more output registers 96, so that a corresponding actuating signal upon the reception of a time control signal is supplied via the control line 46 at the output signal 49.

The trigger interface of the output stage 44 of the control system 25 may be scaled in any desired manner. In this case, preferably only a single control line 46 is needed to supply the time control signal. For the programming of the memory 91 and/or the selection of a data page 92 by the demultiplexer 95 either serial or parallel interfaces may be used. The use of a serial interface has the advantage that only a single data line and optionally a minimum of control lines are required for the transfer of data between the trigger circuit 45 and the output stage 44. The use of a parallel interface has the advantage that a particularly fast transfer of data between the trigger circuit 45 and the output stage 44 is possible.

In the example represented in FIG. 5 a serial interface, SPI, is therefore used for the time-non-critical programming of the memory 91. For selection of the signal shape to be used and the output channel 49 to be used for the output, on the other hand, a parallel selection interface 47 is used. Further different trigger schemes are described in FIGS. 6A to 6C as well as in FIG. 7.

FIG. 6A shows an assignment table for the assignment of individual data pages 92 to a predetermined code word that is transmitted via the selection interface 47. In the exemplary embodiment, the selection interface 47 comprises three parallel selection lines SEL2, SEL1 and SEL0, the logic values of which are represented in the left three columns of FIG. 6A. Taken as a whole, the signals transmitted via the selection interface 47 give rise to a code word that determines a data page 92 of the memory 91. The use of three parallel selection lines SEL2, SEL1 and SEL0 for the selection interface 47 gives rise to eight possible signal combinations, to which eight different data pages 92 are assigned.

In the right two columns of the table according to FIG. 6A different parameters are represented, which determine a signal shape selection 93 and a channel selection 94. To each of the eight data pages 92 a different combination of a signal shape selection 93 and a channel selection 94 is assigned. In the exemplary embodiment, one each of four output channels 49 with in each case a first or a second signal shape may be selected.

FIG. 6B shows a simplified signal propagation diagram of the trigger interface for communication between the trigger circuit 45 and the output stage 44. In a first time interval $T_1$ data are transferred from the trigger circuit 45 to the output stage 44 via the data interface 90. For example, the data pages 92 having the signal shape selections 93 and the channel selections 94 may be transferred from the trigger circuit 45 into the memory 91 of the output stage 44. Alternatively or additionally, parameters or data may also be communicated, by means of which the selectable signal shapes are determined.

In a second time interval $T_2$ a first data page 92 (page0) is selected via the selection interface 47. For this purpose, for example the logic values 0, 0 and 0 are transmitted via the three control lines of the selection interface 47. At the same time, via the control line 46 a time control signal 97 is supplied to the output stage 44. For example, the first falling edge of the time control signal 47 may lead to triggering of the rendering of a predetermined signal shape by the output stage 44.

In a third time interval $T_3$ a fresh selection signal is supplied via the selection interface 47. For example, the third data page 92 (page2) may be selected by communication of the logic values 0,1 and 0 via the selection interface 47. The signal shape assigned to the signal shape selection 93 is retrieved likewise by means of a time control signal 97 and in this case rendered via the selected output channel 49b.

In the embodiment, in a fourth time interval the fifth data page (page4) is selected by communication of the logic values 1, 0 and 0 via the selection interface 47 and, upon reception of a further time control signal 97, is used for the output of an actuating signal by the output stage 44.

Figure 6C:
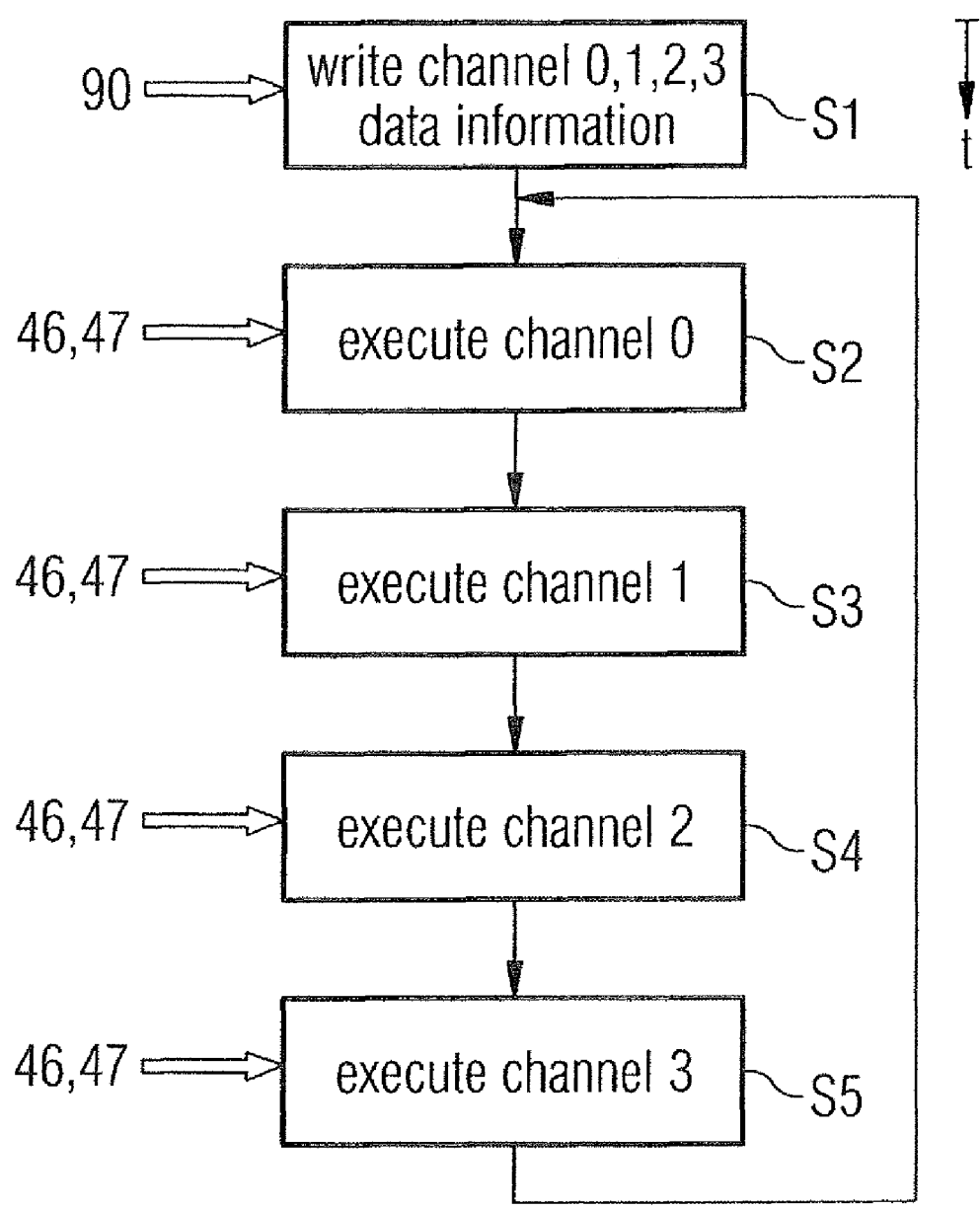

FIG. 6C shows a sequence diagram of an operating method of the control system 25. In a first step S1 parameter data are written via the data interface 90 into the memory 91.

In a next step S2 a desired signal shape is selected for the first output channel 49a with the aid of the selection interface 47 and activated via the control line 46. In a further step S3 a further signal shape is selected for rendering via the second output channel 49b and activated via the control line 46. In the step S4, via the selection interface 47 a desired signal shape is selected for a third output channel 49c and activated via the control line 46. In a further step S5, via the selection interface 47 a desired signal shape is selected for the fourth output channel 49d and activated via the control line 46.

In the case of an internal combustion engine having four injection valves 18, the method is then continued in the step S2.

Figure 7:
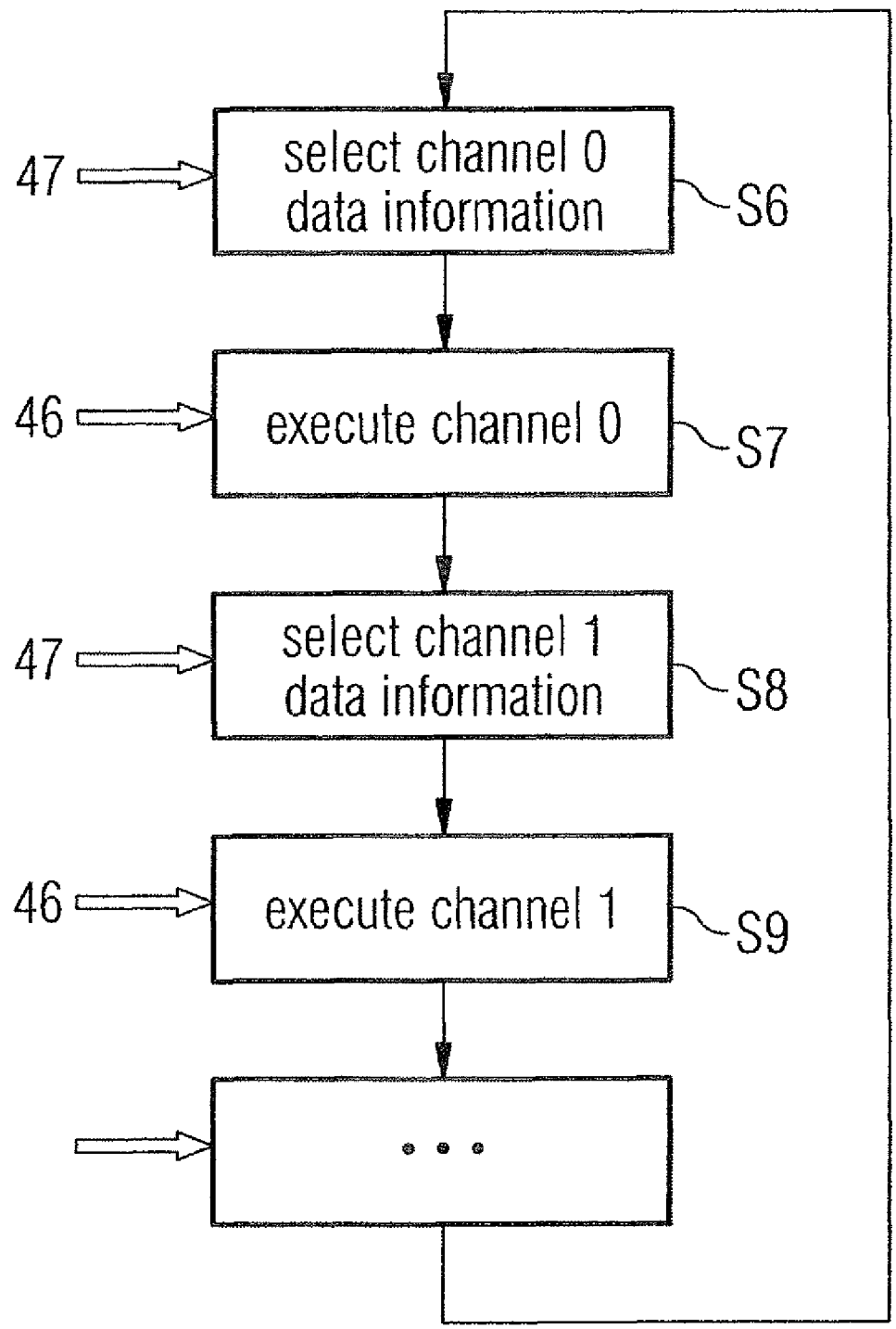

FIG. 7 shows an operating method for a control system 25 according to an alternative embodiment of the invention. In the example represented in FIG. 7, in a first step S6 parameters for use with a first output channel 49a are selected via the selection interface 47. In a next step S7, the selected parameters after reception of a time control signal 97 are rendered via the control line 46 at the output channel 49a.

In a next step S8, optionally changed parameters are selected via the selection interface 47. The parameters selected in the step S8 are intended for rendition at a second output channel 49b of the output stage 44. In a step S9, after reception of a further time control signal 97 via the control line 46 the selected parameters are used to generate a suitable actuating signal at the output channel 49b.

If the control system 25 is used to trigger further output channels 49c or 49d, then in subsequent steps that are however not represented in FIG. 7 further parameters are selected by means of the trigger circuit 45 and used by the output stage 44 to generate suitable actuating signals. The method then starts afresh in step S6.

Further triggering methods and embodiments of the trigger interface are possible. For example, individual parameters, which describe for example the signal shape of an actuating signal and change only relatively rarely, for example upon heating or ageing of the internal combustion engine, may be transmitted via a data interface 90 and stored in data pages 92, while the signal shape selection 93 or the channel selection 94, which changes very frequently, is carried out promptly via the selection interface 47.

The described embodiments therefore allow an improved scalability of the trigger interface and the use of uniform trigger circuits 45 and output stage 44 for a plurality of different internal combustion engines having different numbers of valves or cylinders. The control system 25 is suitable in particular for use in any type of vehicle having a spark ignition- or diesel engine, in particular for triggering a plurality of injection valves 18 or other final controlling elements.

The invention claimed is:

1. An operating method for a control system having a trigger circuit and an output stage connected thereto having a plurality of output channels, comprising the steps of:
encoding at least one signal shape selection and at least one channel selection in at least one selection signal by the trigger circuit,
transmitting the at least one coded selection signal by a selection interface from the trigger circuit to the output stage;
decoding the at least one encoded selection signal by the output stage;
supplying a time control signal from the trigger circuit by a single control line; and
supplying an actuating signal, being determined by the decoded selection signal and having at least one selected signal shape, at at least one selected output channel of the output stage when the time control signal is supplied.

2. The operating method according to claim 1, including the step of selecting in the decoding step at least one data page of a plurality of data pages of the output stage device, wherein the selected data page comprises the at least one signal shape selection and the at least one channel selection.

3. The operating method according to claim 2, including the step of determining by the trigger circuit in the encoding step at least one code word, transmitting the determined code word, and selecting in the decoding step the selected data page based on the transmitted code word.

4. A control system for an internal combustion engine, comprising:
a trigger circuit for supplying trigger signals;
an output stage having a plurality of output channels for supplying actuating signals;
a trigger interface for connecting said trigger circuit and said output stage, said trigger interface including a single control line for supplying a time control signal and a selection interface;
said trigger circuit being constructed for encoding at least one signal shape and at least one channel selection in at least one selection signal and transmitting the at least one selection signal by said selection interface to said output stage; and
said output stage being constructed for decoding the selection signal and upon supplying the time control signal supplying an actuating signal which is determined by the selection signal and having at least one selected signal shape, at at least a selected one of said output channels.

5. The control system according to claim 4, wherein said trigger circuit is a programmable microcontroller.

6. The control system according to claim 4, wherein said output stage is an application-specific integrated circuit.

7. The control system according to claim 4, including a plurality of injection valves which receive actuating signals from the system.

8. The control system according to claim 4, wherein said output stage includes a memory for a plurality of data pages and a demultiplexer, each of the data pages determines at least one signal shape selection and/or at least one channel selection, and said trigger circuit including said selection interface transmits a code word, and a transmission of the code word determines one of the plurality of data pages and is selected by said demultiplexer to generate a signal by said output stage.

9. The control system according to claim 8, wherein said selection interface has a plurality of parallel data lines for parallel transmission of the code word and said output stage has a parallel decoder to decode the parallel-transmitted code word.

10. The control system according to claim 8, wherein said selection interface has a serial data line for serial transmission of the code word and said output stage has a serial decoder to decode the serially-transmitted code word.

11. The control system according to claim 4, wherein said trigger interface comprises an additional data interface that transmits data from said trigger circuit to said output stage.

12. The control system according to claim 11, wherein said data interface is a serial interface and said output stage comprises a decoder to decode serially-transmitted data.

13. The control system according to claim 11, wherein said data interface transmits a plurality of data pages from said trigger circuit to said output stage, and the data pages select at least one signal shape selection and/or determine at least one channel selection for said output stage.

* * * * *